United States Patent [19]

Mogi

[11] Patent Number: 4,820,015
[45] Date of Patent: Apr. 11, 1989

[54] OPTICAL FIBER BUNDLE HAVING IMPROVED TERMINAL STRUCTURE

[75] Inventor: Masaharu Mogi, Kanagawa, Japan

[73] Assignee: Sumitomo Electric Industries, Ltd., Osaka, Japan

[21] Appl. No.: 139,310

[22] Filed: Dec. 29, 1987

[30] Foreign Application Priority Data

Jan. 14, 1987 [JP] Japan .................................. 62-7300

[51] Int. Cl.⁴ .......................... G02B 6/00; G02B 6/04
[52] U.S. Cl. ................................. 350/96.24; 350/96.10
[58] Field of Search ............... 350/96.10, 96.15, 96.24, 350/96.25, 96.26

[56] References Cited

U.S. PATENT DOCUMENTS

| | | | |
|---|---|---|---|
| 3,589,795 | 5/1971 | Miyazaki et al. | 350/96.15 |
| 4,302,069 | 11/1981 | Niemi | 350/96.15 |
| 4,547,668 | 10/1987 | Tsikos | 350/96.25 X |
| 4,707,075 | 11/1987 | Fukushima et al. | 350/96.24 X |

FOREIGN PATENT DOCUMENTS

| | | |
|---|---|---|
| 77124/81 | 2/1983 | Australia . |
| 0141308 | 5/1985 | European Pat. Off. . |
| 0143856 | 6/1985 | European Pat. Off. . |
| 1093751 | 12/1967 | United Kingdom . |
| 2155625 | 9/1985 | United Kingdom . |

OTHER PUBLICATIONS

Patent Abstract of Japan, vol. 2, No. 64, 17th May 1978
Patent Abstract of JP-A-5329741 (Nippon Denshindenwa Kosha) 20-3-78.

Primary Examiner—William L. Sikes
Assistant Examiner—Akm E. Ullah
Attorney, Agent, or Firm—Cushman, Darby & Cushman

[57] ABSTRACT

At the end of an optical fiber bundle, a reflecting member is provided to deflect the emitted light from a portion of the fibers in a direction transverse to the axis of the fiber bundle, thereby enhancing the ability of the fiber bundle to irradiate lateral surfaces while the undeflected light maintains the irradiation of a surface confronting the axial end face of the fiber bundle.

12 Claims, 4 Drawing Sheets

OPTICAL FIBER BUNDLE HAVING IMPROVED TERMINAL STRUCTURE

BACKGROUND OF THE INVENTION

The present invention relates to a terminal structure of an optical fiber bundle formed by bundling a plurality of optical fibers.

It is known to introduce light into an optical fiber bundle so as to cause the light to be guided by the optical fiber bundle to a destination. In this case, light emitted from a light exit end of the optical fiber bundle has an exit angle $\theta$ depending on the N.A. (numerical aperture) of the optical fiber strands used in the fiber bundle. It is known that a larger N.A. leads to a larger exit angle $\theta$, and that the exit angle $\theta$ is determined by the following expression (1) when the light exits into air $$\theta = 2.\sin^{-1}(N.A.) \qquad (1)$$

The exit angle $\theta$ typically has the following values for various types of optical fibers:

(1) In the case of an optical fiber composed of a core of $GeO_2.SiO_2$ and a cladding of $SiO_2$ for use in light communication or the like. N.A.=0.3 and therefore $\theta = 35°$.

(2) In the case of an optical fiber composed of a core of $SiO_2$ and a cladding of $SiO_2$ and fluorine for use in ultraviolet ray guiding or the like. N.A.=0.2 and therefore $\theta = 23°$.

(3) In the case of an optical fiber composed of a core of $GeO_2.SiO_2$ and a cladding of $SiO_2$ and fluorine for use in illumination light guiding or the like. N.A.=0.35 and therefore $\theta = 41°$.

(4) In the case of a multicomponent-glass optical fiber for use in illumination light guiding or the like N.A.=0.55 and therefore $\theta = 67°$.

As described above an optical fiber of a pure-quartz core commonly used as a light guide for ultraviolet rays has the smallest exit angle $\theta$.

Referring to FIG. 8 of the accompanying drawings, the use of a conventional apparatus will be described hereunder.

FIG. 8 shows a state where the inside of a vessel is subjected to ultraviolet sterilization by use of a conventional optical fiber bundle. As illustrated in FIG. 8, an optical fiber bundle 1 is disposed so as to be directed to an opening of a vessel 2 so that ultraviolet rays emitted from a light exit end surface of the fiber bundle 1 enter into the vessel 2 as indicated by the reference numeral 3 in the drawing so as to illuminate the inner surface of the vessel 2 to thereby sterilize the inner surface of the vessel 2.

Sterilization by use of the foregoing conventional apparatus, however, has been subject to the following problems. A first problem is that, in the case of a bottle-like vessel having a small opening, a lower portion of the opening indicated by reference numeral 4 in FIG. 8 cannot be sterilized at all. Further in the case of a vessel having an uneven inner surface the uneven portion often cannot be sterilized because the uneven portion cannot be irradiated with ultraviolet rays.

A second problem is that even in the case where an inner surface of a vessel is irradiated with ultraviolet rays, the irradiation is performed with a predetermined angle and therefore sufficient sterilization cannot be achieved. FIG. 9 is a diagram for explaining this phenomenon. As illustrated in FIG. 9 when the inner surface of the vessel 2 is irradiated with the ultraviolet rays 3 from the optical fiber bundle 1 with an inclination angle of $\theta/2$ ($\theta$ being an exit angle). the intensity I of irradiation is $\sin(\theta/2)$ times as large as that in the case where irradiation is performed vertically. Therefore, in the case of the foregoing optical fiber composed of a core of $SiO_2$ and a cladding of $SiO_2$ and fluorine.

$$\sin(\theta/2) = \sin 11.5$$
$$= 0.2$$

Accordingly, the intensity of irradiation is lowered to about 20%.

Because the above-described problems the conventional apparatus shown in FIG. 8 has not been used for sterilization.

It is therefore an object of the present invention to provide a terminal structure of an optical fiber bundle in which it is possible to easily and accurately perform sterilization of the inside of a vessel such as a bottle or the like.

SUMMARY OF THE INVENTION

According to a first aspect of the present invention an optical fiber bundle is provided at its end with means for reflecting a portion of the emitted light to the side. In one example, the fiber is provided with a reflecting member having an opening formed at its central portion and a circular-cone mirror face formed at its outside surface, the opening being arranged so that a plurality of the optical fibers disposed at a central portion of the optical fiber bundle are inserted into and held by the opening so as to allow light emitted from the optical fibers disposed at the central portion of the light exit end portion to pass through the opening. The circular-cone mirror face is arranged to reflect light emitted from a plurality of the optical fibers disposed at a circumferential portion of the optical fiber bundle in the direction away from the optical fiber axis.

According to a second aspect of the present invention the terminal structure of an optical fiber bundle is characterized in that a reflecting member is provided which has an opening formed at its central portion and a funnel-shaped mirror face formed at a lower inside surface of the opening, the opening being arranged so that a light exit end portion of the optical fiber bundle is inserted into and held by the opening so as to allow light emitted from a plurality of the optical fibers disposed at a central portion of the optical bundle fiber to pass through the opening. The mirror face is arranged to reflect light emitted from a plurality of ones of the optical fibers disposed at a circumferential portion of the optical fiber bundle in the direction intersecting the central axis of the fiber bundle, the reflection being provided by a funnel-like mirror face formed on the lower portion inner surface of the opening of the reflecting member.

BRIEF DESCRIPTION OF THE DRAWINGS

Preferred embodiments of the present invention will be described hereunder with reference to the accompanying drawings in which like items are correspondingly referenced, and in which.

DETAILED DESCRIPTION OF THE PREFERRED EMBODIMENTS

Figure 1:
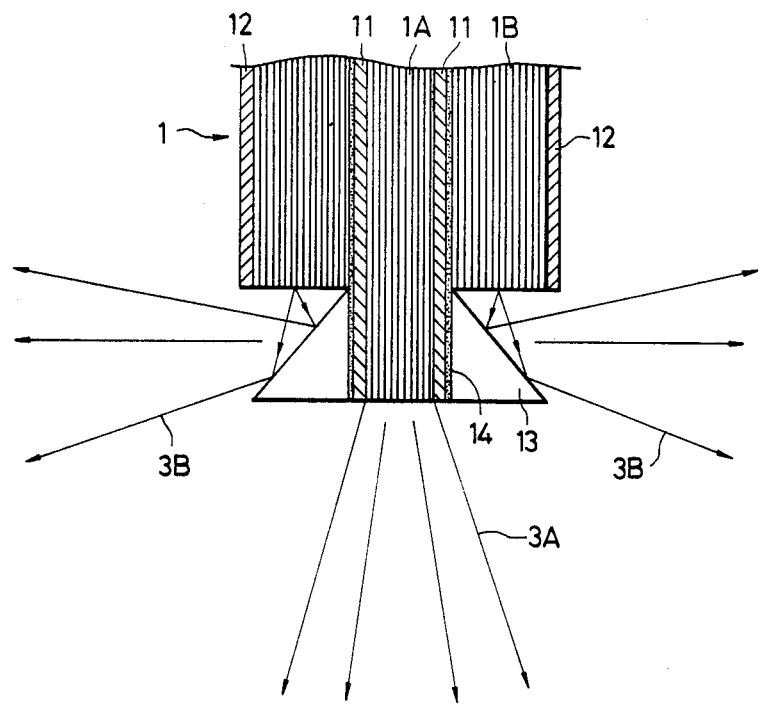
FIG. 1 is a cross section showing the terminal construction of the optical fiber bundle according to a first embodiment of the present invention.

FIG. 1 is a longitudinal cross section showing a terminal portion of an optical fiber bundle according to a first embodiment of the present invention. An optical fiber bundle 1 is concentrically divided into two parts that is, a central-portion fiber bundle 1A and a circumferential-portion fiber bundle 1B which are held by an inside sleeve 11 and an outside sleeve 12' respectively. The central-portion fiber bundle 1A is projected downward together with the inside sleeve 11 by a predetermined length, and a reflecting mirror member 13 having a circular-cone mirror face is fixed to the projecting portion by an adhesive 14. The adhesive 14 is also interposed between the inside sleeve 11 and the circumferential-portion fiber bundle 1B so as to prevent displacement therebetween.

Figure 2:
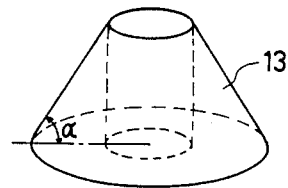
FIG. 2 is a perspective view showing the reflecting mirror member shown in FIG. 1.

FIG. 2 is a perspective view showing the reflecting mirror member 13 used in the first embodiment of FIG. 1. As illustrated in FIG. 2, the reflecting mirror member 13 has an opening formed at its central portion so that the inside sleeve 11 can be inserted through the opening, and has a circular-conically finished surface with a predetermined inclination angle at its circumferential portion. For example, dielectric multilayer coating or aluminum evaporation can be performed on the circular-cone surface so as to make the circular-cone surface a mirror face for selectively reflecting ultraviolet rays having a wavelength of about 254 nm.

The operation of the optical bundle fiber according to the first embodiment will now be described.

Ultraviolet rays propagated through the central-portion fiber bundle 1A are emitted downward from an end surface thereof as indicated by arrows 3A. Ultraviolet rays propagated through the circumferential-portion fiber bundle 1B. An the other hand, are emitted from an end surface thereof, and are reflected by the circular-cone surface of the reflecting mirror member 13 so as to be directed to the side as indicated by arrows 3B in the drawing.

Figure 3:
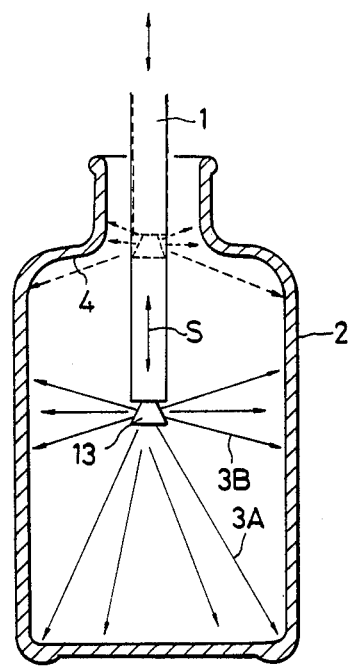
FIG. 3 is a diagram for explaining a sterilizing method using the first embodiment of FIG. 1.

Sterilization of a vessel by the first embodiment of this invention is performed, for example, in a manner as shown in FIG. 3. That is, the optical fiber bundle 1 is inserted through an opening of the vessel 2, and is then reciprocated in the direction of an arrow S. The downward emitted ultraviolet rays 3A irradiated a bottom surface of the vessel 2, and the deflected ultraviolet rays 3B irradiate a side surface of the vessel 2. As a result, a lower portion 4 of the opening of the vessel 2 is equally irradiated with the ultraviolet rays to thereby be sterilized. Even if the vessel 2 has an uneven inner surface, the inner surface can be efficiently irradiated with ultraviolet rays.

Various modifications of the foregoing first embodiment can be made. For example, although in the foregoing embodiment the inside sleeve 11 holds the central-portion fiber bundle 1A and the reflecting mirror member 13 having the circular-cone face is fixed to the sleeve 11, the reflecting mirror member 13 may instead be directly fixed to the central-portion fiber bundle 1A. Further, it is not always necessary to use the adhesive, and it is not always necessary to make the axial position of the end surface of the central-portion fiber bundle 1A coincide with the lower end of the reflecting mirror member 13.

The inclination angle $\alpha$ of the circular-cone surface may be selected, for example, to be 45° so that horizontal reflection can be performed. If $\alpha < 45°$, on the other hand, the reflected light can be sent upward, so that sterilization of the lower portion of the opening of the bottle can be more accurately performed.

The ratio of the number of strands constituting the central-portion fiber bundle 1A to the number of strands constituting the circumferential-portion fiber bundle may be selected in accordance with a shape of the vessel, an object of use, and so on. Further, the ratio may be changed in accordance with the speed of a line using the optical fiber bundle.

Various materials can be used for the elements according to the present invention. For example, the material for the adhesive 14 may be an ordinary epoxy group resin, although it is not limited to this. Further, the method of finishing the reflecting surface is not limited to a dielectric multilayer film coating or the like and the ultraviolet rays to be used are not limited to those having a wavelength of 254 nm.

In order to confirm the effectiveness of the foregoing embodiment, experiments were performed by the inventor of this application as follows.

First, a fiber bundle 1 having an effective bundle area of about 900 optical fiber strands was prepared, with each of a central-portion fiber bundle 1A and a circumferential-portion fiber bundle 1B constituted by about 450 optical fiber strands. A reflecting mirror member 13 was attached as shown in FIG. 1, and the angle $\alpha$ in the drawing was selected to be 45°. The outer diameter of a circular-cone mirror face was selected to be about 8 mm and the reflection factor of the mirror face was selected to be 90%. As a prior art example, on the other hand, an optical bundle fiber having an effective bundle area of about 900 optical fiber strands was prepared and used without modification.

Figure 4A:
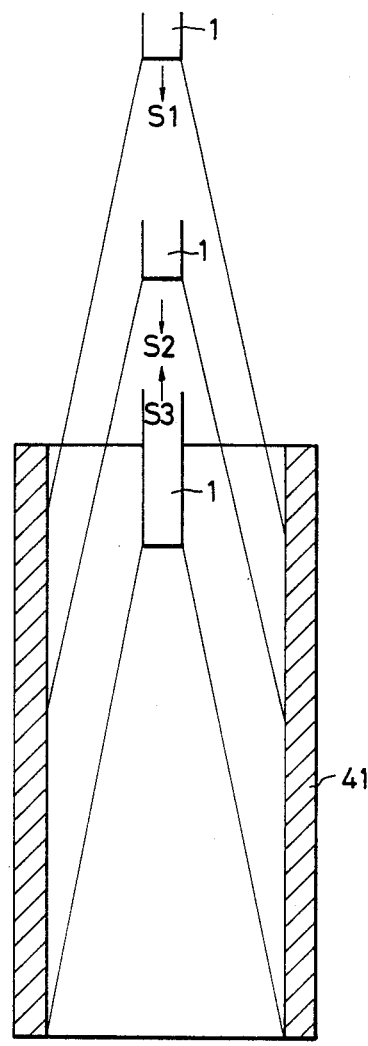
FIGS. 4A and 4B are a diagram for explaining experiments conducted with the fiber bundle construction of the present invention.
Figure 4B:
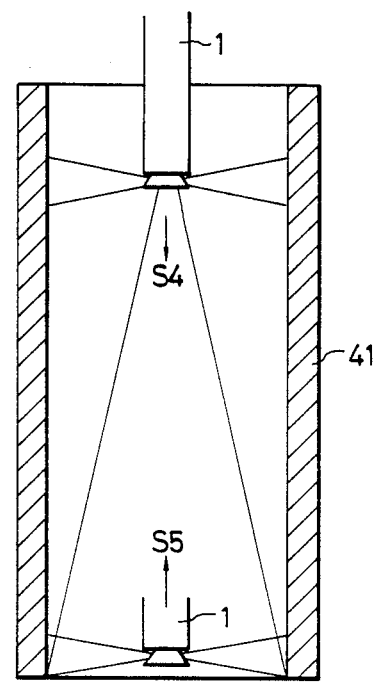

A vessel such as shown in FIGS. 4(A) and 4(B) was used as an object to be sterilized the vessel comprising a pipe 41 having an inner diameter of 50 mm and a height of 100 mm. Ultraviolet rays having a wavelength of 254 nm were supplied through each of the optical fiber bundles 1 and 31 with an intensity such that an intensity value measured at a position 1 cm away from a light exit end of the optical bundle fiber was 700 mW/cm$^2$, and the optical fiber bundle was operated as shown by arrows S1 through S5 in the diagrams of FIGS. 4(A) and 4(B).

Figure 5:
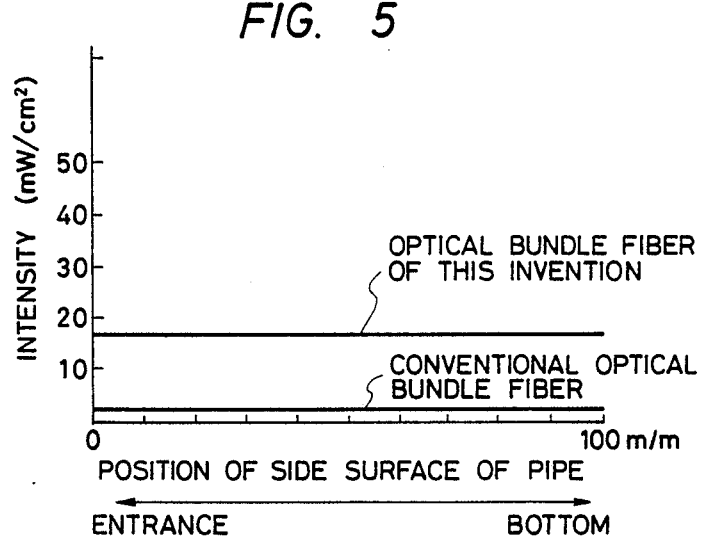
FIG. 5 is a diagram for explaining the results of the experiments of FIG. 4.

In the foregoing experiments, the intensity of ultraviolet irradiation was measured on an inner side surface of each of the pipes 41, and FIG. 5 illustrates the measurement results obtained. As seen in FIG. 5, the intensity of irradiation according to the embodiment of the present invention along the side surfaces of the pipe was about five times as much as that in the prior art example.

A second embodiment of the present invention will now be described with reference to FIGS. 6 and 7.

Figure 6:
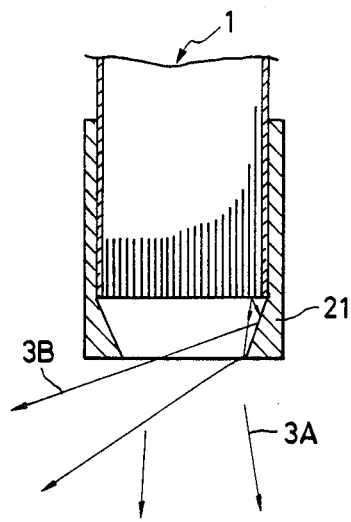
FIG. 6 is a cross section of an optical fiber bundle according to a second embodiment of the present invention.
Figure 7:
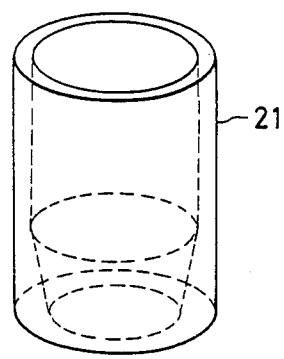
FIG. 7 is a perspective view showing the reflecting member shown in FIG. 6.
Figure 8:
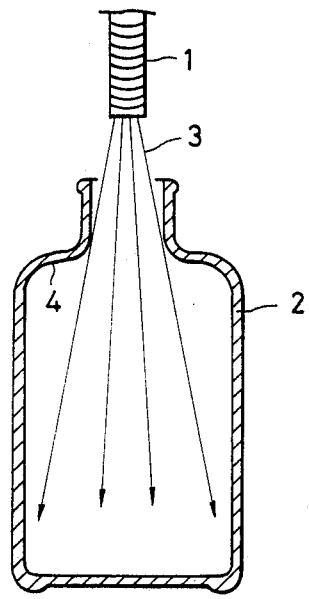
FIGS. 8 and 9 are diagrams for explaining the prior art.
Figure 9:
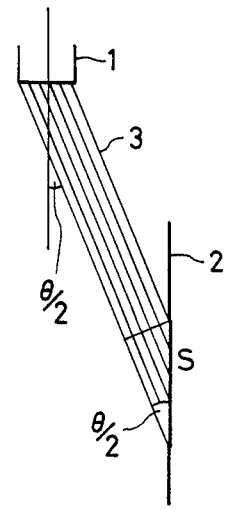

FIG. 6 is a cross section showing the second embodiment, and FIG. 7 is a perspective view showing a reflecting member to be used in the same embodiment. The second embodiment is different from the first embodiment in that a reflecting member 21 is attached to an outside sleeve 12 and that an inwardly tapered reflecting surface is formed at a lower inner surface portion of an opening of the reflecting member 21.

According to this embodiment, light emitted from the optical fibers disposed at a circumferential portion of the optical fiber bundle is reflected by the funnel-like surface of the reflecting member 21. Therefore, ultraviolet rays can be sent sidewards as shown by arrows 3B in FIG. 6.

Further, in this second embodiment, it is not necessary to divide the optical fibers constituting the optical fiber bundle 1 into central and circumferential portions in advance, and it is not necessary to specifically modify the shape of the terminal end of the conventional optical fiber bundle. Therefore, not only can the design and fabrication of the terminal be easily performed but also the reflecting member 21 can be exchanged with different reflecting members in accordance with the shape of the vessel.

As described in detail above, according to the first aspect of the present invention, light from the circumferential-portion fiber bundle is reflected sidewards by the circular-cone mirror face formed on the outer surface of the reflecting member so that sterilization at the inside of the inside of a vessel such as a bottle or the like can be easily and accurately performed.

According to the second aspect of the present invention, light from the circumferential portion of the optical bundle fiber is reflected sidewards by the funnel-like mirror face formed on the lower inner surface portion of the opening of the reflecting member so that sterilization at the inside of a vessel such as a bottle or the like can again be easily and accurately performed. Further, according to this second aspect of the present invention, there is also the advantage that the reflecting member can be easily exchanged in accordance with a desired irradiation pattern characteristic of a particular object of use.

What is claimed:

1. An optical fiber bundle comprising:
   a first plurality of optical fibers, their end faces forming a terminal structure;
   a second plurality of optical fibers surrounding said first plurality of optical fibers;
   reflecting means surrounding said terminal structure, said reflecting means radially reflecting light emitted from said second plurality of fibers and allowing light emitted from said first plurality of fibers to pass without reflection.

2. An optical fiber bundle as claimed in claim 1, wherein said reflecting means reflects light away from the central axis of said fiber bundle.

3. An optical fiber bundle as claimed in claim 2, wherein said reflecting means is provided with a central hole therein through which light emanating from said first plurality of fibers is permitted to pass.

4. An optical fiber bundle as claimed in claim 3, wherein said first plurality of fibers extends through said hole.

5. An optical fiber bundle as claimed in claim 3, wherein said reflecting means comprises a circular-cone mirror face.

6. An optical fiber bundle as claimed in claim 1, wherein said reflecting means includes a reflecting surface formed of a multilayer dielectric film coating.

7. An optical fiber bundle as claimed in claim 1, wherein said reflecting means includes a reflecting surface formed of an aluminum evaporation film.

8. An optical fiber bundle as claimed in claim 1, wherein said reflecting means selectively reflects light of a predetermined wavelength.

9. An optical fiber bundle as claimed in claim 8, wherein said predetermined wavelength is in the range from 200 nm to 300 nm.

10. An optical fiber bundle as claimed in claim 9, wherein said predetermined wavelength is substantially 254 nm.

11. An optical fiber bundle as claimed in claim 1, wherein said reflecting means reflects light toward the central axis of said fiber bundle.

12. An optical fiber bundle as claimed in claim 11, wherein said reflecting member is provided with a central hole therein through which light emanating from said first plurality of fibers is permitted to pass.

* * * * *